Feb. 27, 1951      G. O. HOFFSTETTER      2,543,287
CONVEYER AND HEATER THEREFOR
Filed Jan. 17, 1946      4 Sheets-Sheet 1
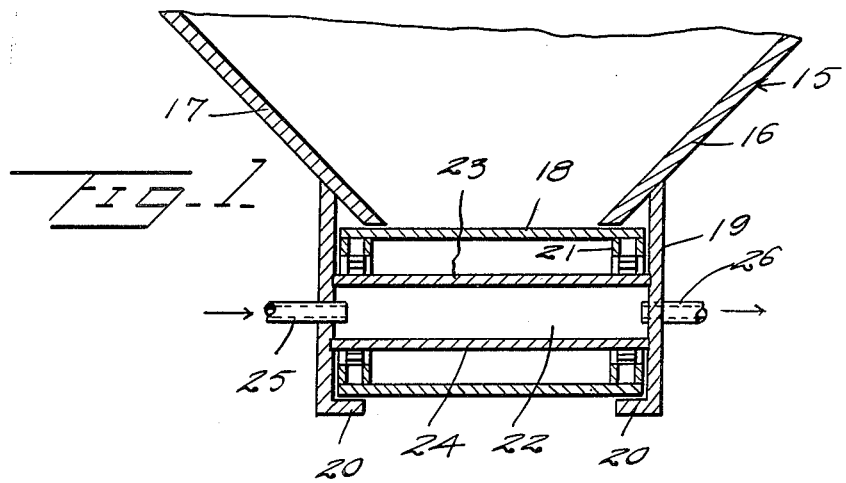
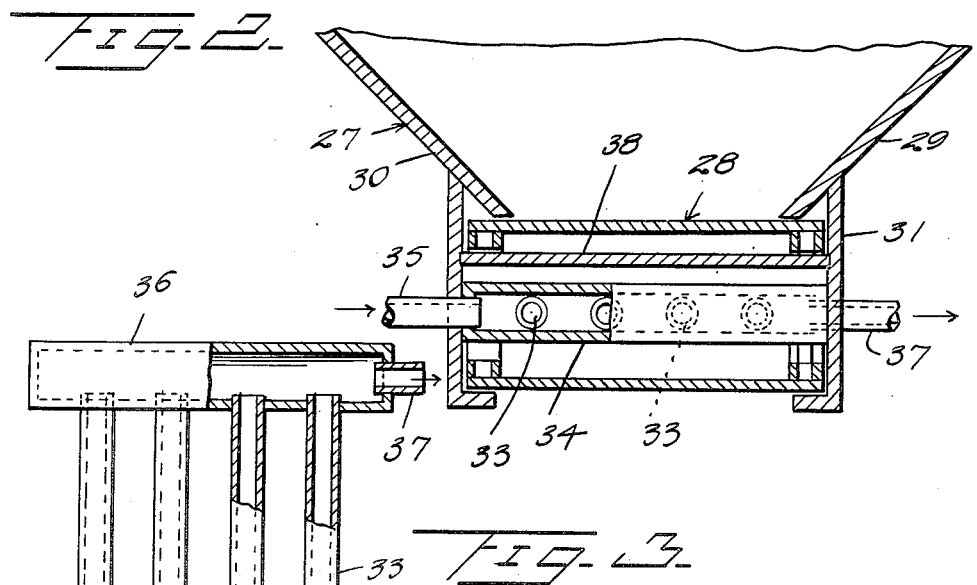
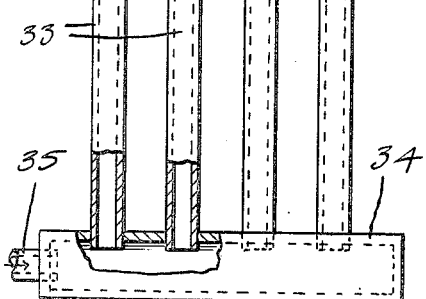
Inventor
G. O. Hoffstetter
By Kimmel & Crowell
Attorneys

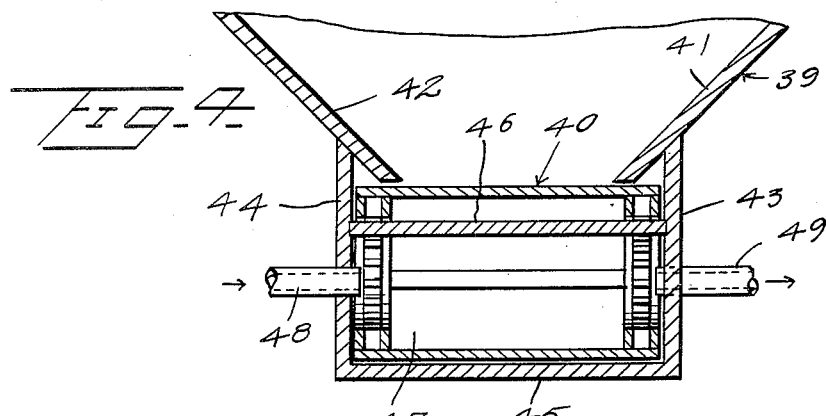
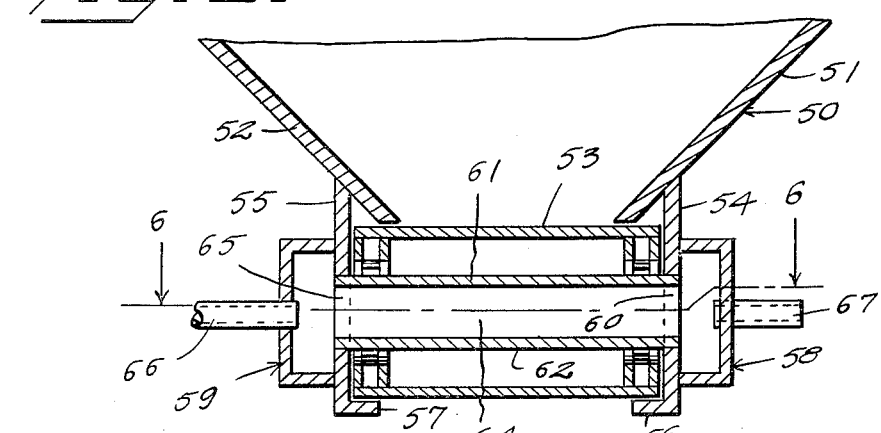
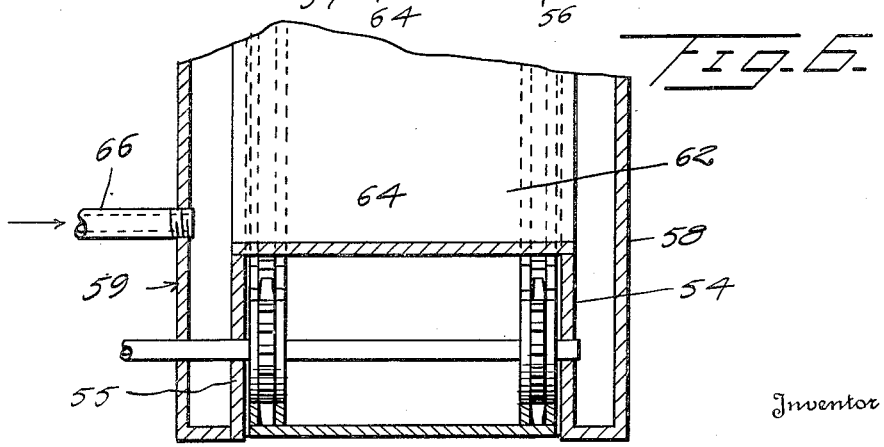

Feb. 27, 1951 — G. O. HOFFSTETTER — 2,543,287
CONVEYER AND HEATER THEREFOR
Filed Jan. 17, 1946 — 4 Sheets-Sheet 3
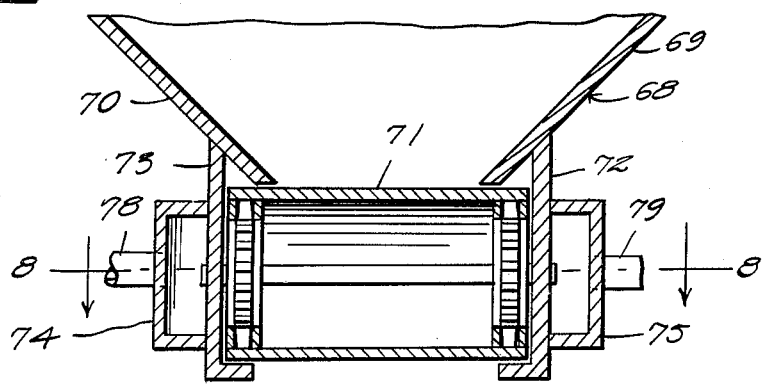
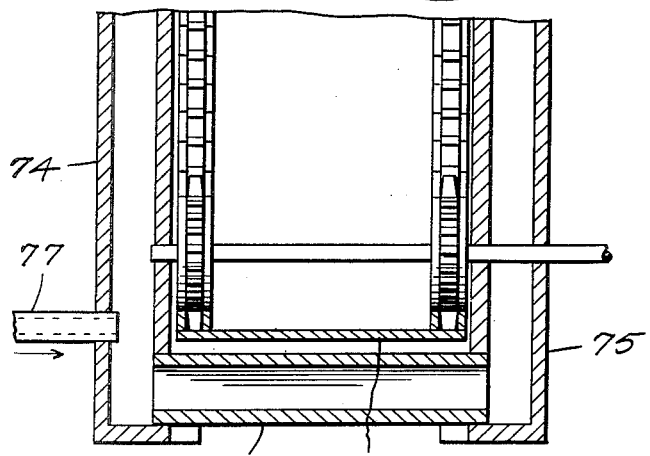
Inventor
G. O. Hoffstetter
By Kimmel & Crowell, Attorneys

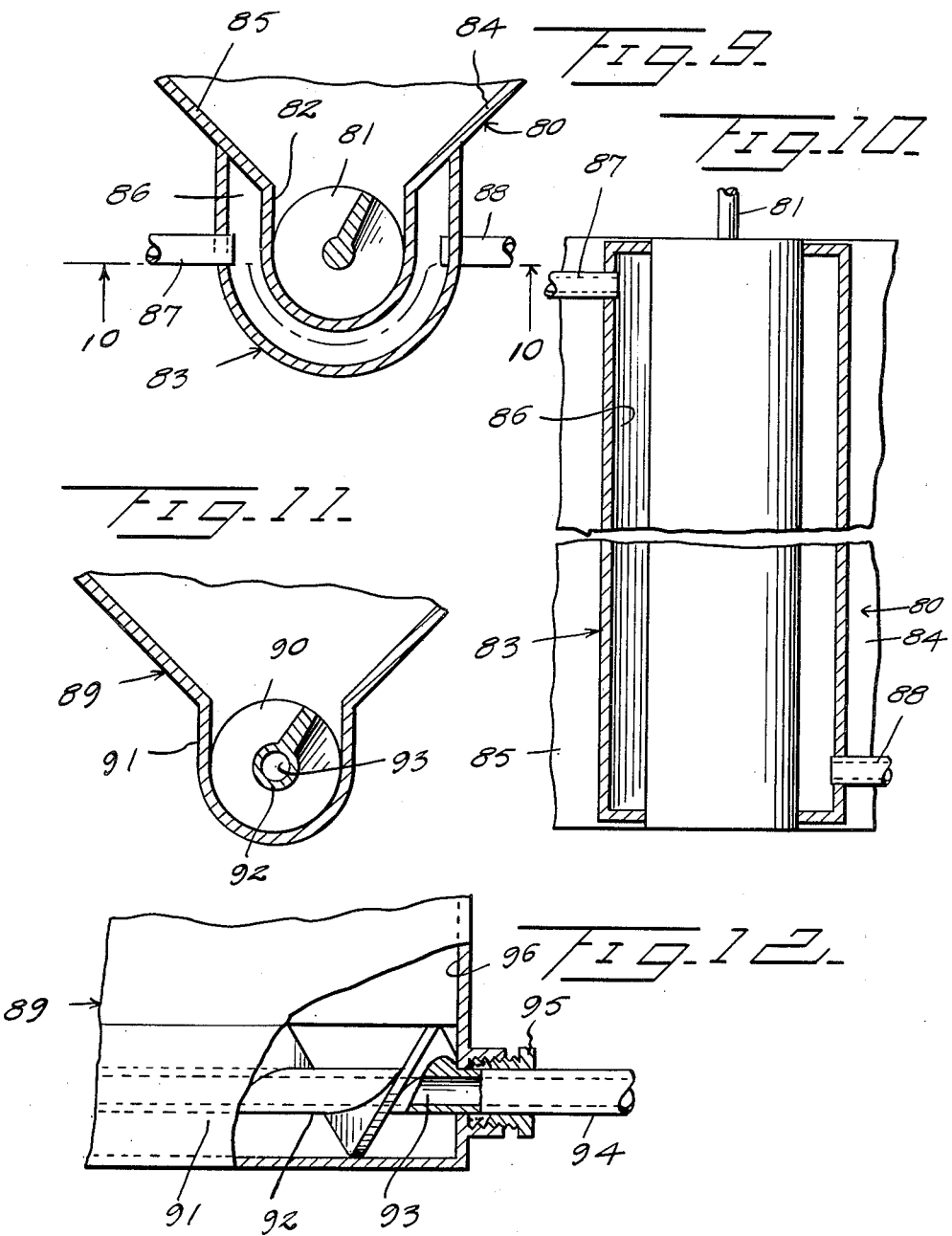

Patented Feb. 27, 1951

2,543,287

UNITED STATES PATENT OFFICE 2,543,287

CONVEYER AND HEATER THEREFOR

George O. Hoffstetter, Jerseyville, Ill.

Application January 17, 1946, Serial No. 641,778

5 Claims. (Cl. 222—146)

This invention relates to hoppers, and more particularly to an improved means for heating the lower portion of the hopper including the material in the hopper and the conveyor which discharges the material from the hopper.

An object of this invention is to provide in a hopper construction, particularly a hopper used with a material spreader such as lime, fertilizer or the like, or with a delivery hopper for delivering relatively fine material such as grain, coal or the like, a heating means whereby the material which is conveyed along the bottom of the hopper will be held against freezing in cold weather, and the conveyor itself will be prevented from becoming jammed through freezing of the moisture which may drip from the moist material.

Another object of this invention is to provide a construction of this kind which may be used with either a belt conveyor, a screw conveyor or a chain or other suitable conveyor, for heating the conveyor and the material to prevent injury to the conveyor during freezing weather and to provide for the normal discharge of the material from the hopper during freezing weather.

With the foregoing and other objects in view, the invention will be more fully described hereinafter, and will be more particularly pointed out in the claims appended hereto.

In the drawings,

Figure 1 is a fragmentary transverse vertical section of a hopper having a material conveyor at the bottom thereof for discharging the material at one end of the hopper, and including a heating means constructed according to an embodiment of this invention.

Figure 2 is a transverse sectional view, similar to Figure 1, of a modification of this invention.

Figure 3 is a plan view, partly broken away, of the heating means embodied in Figure 2.

Figure 4 is a fragmentary vertical section of another modification of this invention.

Figure 5 is a fragmentary vertical section of a further modification of this invention.

Figure 6 is a fragmentary sectional view, taken on the line 6—6 of Figure 5.

Figure 7 is a fragmentary vertical section of a further modification of this invention.

Figure 8 is a sectional view, taken on the line 8—8 of Figure 7.

Figure 9 is a fragmentary vertical section of a further modification of this invention.

Figure 10 is a sectional view, taken on the line 10—10 of Figure 9.

Figure 11 is a fragmentary vertical section of a further modification of this invention.

Figure 12 is a fragmentary longitudinal section, partly in detail, of the structure shown in Figure 11.

Referring to the drawings, and first to Figure 1, the numeral 15 designates generally a hopper formed of downwardly convergent walls 16 and 17. An endless conveyor in the form of a belt 18 is disposed at the lower open ends of the walls 16 and 17 and the conveyor 18 is disposed between a pair of depending lengthwise extending plates 19, having inwardly extending lower flanges 20.

The conveyor 18 includes a chain 21 secured to the inner side of the belt 18 and which is adapted to be trained over forward and rear pairs of sprockets (not shown).

In order to provide a means whereby the conveyor 18 may be heated so as to prevent freezing of moisture on the upper and lower runs thereof, I have provided a heating chamber 22 which is formed between the upper and lower runs of the conveyor 18. The chamber 22 is formed by securing an upper elongated plate 23 between the depending plates 19 and positioning a lower plate 24 between the depending plates 19 spaced downwardly from the upper plate 23.

A pipe 25 is extended through one of the plates 19 adjacent one end of the hopper and preferably the forward end thereof, and the pipe 25 may be, as an example, connected to the exhaust pipe of an internal combustion engine for transmitting the hot exhaust gasses to the chamber 22. The heating medium is exhausted from the chamber 22 through an outlet pipe 26 connected to the opposite wall or plate 19 at the opposite end of the hopper from the intake pipe 25.

Referring now to Figures 2 and 3, there is disclosed a hopper 27 which is similar to the hopper 15 having an endless conveyor 28 movably disposed at the lower spaced ends of the walls 29 and 30 of the hopper. The conveyor 28 is movably disposed between a pair of depending plates 31 having lower flanges 32 confronting each other, and in the present instance, the conveyor 28 is heated by means of a plurality of lengthwise extending pipes 33 disposed between the runs of the conveyor. The pipes 33 at their forward ends are connected to a transversely extended manifold 34 which has an inlet pipe 35 connected thereto, and the rear ends of the pipes 33 are connected to a rear manifold 36. The rear manifold 36 has an outlet pipe 37 connected therewith for exhausting the heating medium or providing a circulating means for circulating a heating medium through the pipes 33 and the manifolds 34 and 36. In the present instance, the heating medium may, if desired, be water or other heated fluid, which may be circulated through the pipes 33 and the manifolds. An upper plate 38 is interposed between the pipes and the manifolds and the upper run of the conveyor 28 being secured at its opposite lengthwise edges to the side walls 31 forming the support and housing for the conveyor 28.

Referring now to Figure 4, there is disclosed a hopper 39 similar to the hopper 15, which has a conveyor 40 movably disposed between the lower spaced ends of the side walls 41 and 42 thereof. The conveyor 40 is movably mounted in a conveyor housing formed by depending side walls 43 and 44, and a lower wall 45. An inner wall 46 is secured between the side walls 43 and 44 below the upper run of the conveyor 40, and forms a heating chamber 47. An inlet pipe 48 is connected at one end to the side wall 44 and at the other end to a source of heating medium and an outlet or exhaust pipe 49 is connected at one end to the wall 43.

Referring now to Figures 5 and 6, there is disclosed a hopper 50 formed of downwardly convergent walls 51 and 52 which are spaced apart at their lower ends. An endless conveyor 53 closes the opening formed by the lower ends of the side walls of the hopper, and the conveyor 53 has disposed at the opposite lengthwise edges thereof depending parallel plates 54 and 55. The plate 54 has an inwardly extending flange 56 at its lower edge and the plate 55 has an inwardly extending flange 57 at its lower edge.

In order to provide for heating of the conveyor 53, I have provided a pair of housings 58 and 59 on the outer sides of the walls 54 and 55, respectively. The housing 58 opens inwardly toward the wall 54 which is formed with an elongated opening or slot 60. A pair of plates 61 and 62 are secured between the two plates or walls 54 and 55, thereby forming a connecting chamber 64. The housing 59 opens toward the wall 55 and the latter wall is formed with an opening 65. The two plates 61 and 62 are secured between the two openings 60 and 65 so that communication will be provided between the two housings 58 and 59 for not only heating the walls 54 and 55 along the lengthwise edges of the conveyor 53, but also for heating the space between the upper and lower runs of the conveyor.

An inlet pipe 66 is connected at one end to the housing 59 and an outlet pipe 67 is connected to the housing 58. A suitable heating medium may be circulated through the housings 59 and 58, passing from housing 59 through the chamber 64 to the housing 58.

Referring now to Figures 7 and 8, there is disclosed a further modification of this invention, showing a hopper 68 formed of downwardly convergent walls 69 and 70. An endless conveyor 71 closes the bottom of the hopper 68 and is movably disposed between a pair of depending walls or plates 72 and 73. A housing 74, which is substantially U-shaped in transverse section, is secured to the wall 73 and a U-shaped housing 75 is secured to the outer side of the wall 72. The two housings 74 and 75 are connected together at the forward end of the hopper by means of a connecting manifold or pipe 76. An inlet pipe 77 is connected to the housing 74 at the forward end thereof, and outlet pipes 78 and 79 are connected to the housings 74 and 75 adjacent the rear ends thereof. The heating medium is discharged into the housing 74 and may then flow through the manifold 76 to the housing 75 and may flow lengthwise of the housing 74.

Referring now to Figures 9 and 10, there is disclosed a further modification of this invention, wherein the hopper 80 has a screw conveyor 81 in the bottom thereof which is rotatable in a conveyor housing 82. A transversely U-shaped housing 83 is dependingly secured to the side walls 84 and 85 of the hopper, and is spaced from the conveyor housing 82 so as to thereby form a heating chamber 86 about the housing 82. An inlet pipe 87 is connected to the forward end of the housing 83 and an outlet pipe 88 is connected to the rear portion of the housing 83.

Referring now to Figures 11 and 12, there is disclosed a further modification of this invention, including a hopper 89 having a screw conveyor 90 rotatably mounted in a conveyor housing 91. In the present instance, the conveyor 90 includes a hollow shaft 92 which forms a heating chamber 93 centrally of the conveyor 90. The forward end of the hollow shaft 92 may have an intake pipe 94 connected thereto, the pipe 94 engaging in a gland 95 carried by the forward wall 96 of the hopper. The rear end of the shaft 92 may be opened to the atmosphere, if desired, for exhausting the heating medium such as exhaust gasses at the rear of the hopper.

With a combined hopper conveyor and heating means as hereinbefore described, relatively moist material such as lime, coal, grain or the like, may be discharged from the hopper in freezing weather without having the material freeze or clog the conveyor. It will be understood that the term conveyor as used in the description and claims includes an endless belt, a screw conveyor, a chain conveyor, cleats or the like.

What is claimed is:

1. In combination, a hopper, said hopper having longitudinal sides sloping downwardly and inwardly toward each other defining an elongated opening at the bottom thereof, a pair of spaced walls disposed dependingly, one from each sloping wall and adjacent said opening, a pair of vertically spaced horizontal walls extending between and connected to said depending side walls to define a heating chamber between themselves and said depending side walls, an endless belt conveyor at the bottom of said hopper having an upper and a bottom run thereof horizontally disposed respectively above and below said heating chamber.

2. In combination, a hopper, said hopper having longitudinal sides sloping downwardly and inwardly toward each other defining an elongated opening at the bottom thereof, a pair of side walls in dependent relation to said sloping walls with each one of said pair being spaced at opposite sides of said opening, two vertically spaced horizontal walls extending between and connected to said dependent side walls to define a heating chamber between themselves and said dependent side walls, an endless belt conveyor having horizontally disposed top and bottom runs disposed at the bottom of said hopper, said top run being operatively movable between said elongated opening and said heating chamber with said bottom run disposed under and adjacent to said heating chamber.

3. In combination, a hopper, said hopper having longitudinal sides sloping downwardly and inwardly toward each other defining an elongated opening at the bottom thereof, a pair of spaced walls disposed dependingly, one from each sloping wall and adjacent said opening, a pair of vertically spaced horizontal walls extending between and connected to said depending side walls to define a heating chamber between themselves and said depending side walls, a horizontally disposed endless belt conveyor having vertically spaced top and bottom runs extending between said dependent side walls with said heating chamber disposed between said runs for heating both runs of the conveyor.

4. In a combined hopper and endless belt conveyor wherein the conveyor is disposed under the hopper, said hopper having longitudinal sides that slope downwardly and inwardly toward each other to define an elongated opening at the bottom of the hopper, a pair of vertical side walls dependently extending downwardly from said sloping walls with opposite ones of said vertical walls being spaced at opposite sides of said conveyor, said conveyor having a top horizontal run disposed adjacent said hopper opening and a bottom run disposed under said top run, a pair of vertically spaced horizontal walls extending between and connected to said depending side walls to define a heating chamber between themselves and said depending side walls, one of said horizontal walls being disposed adjacent said top run of the conveyor and the other horizontal wall being disposed adjacent the bottom run whereby a heat medium circulated in said chamber will heat both runs of said conveyor.

5. In combination, a hopper, said hopper having a pair of ends spaced apart by longitudinal sides that slope downwardly and inwardly toward each other to define an elongated opening at the bottom thereof, a pair of spaced walls disposed dependingly, one from each sloping wall and adjacent said opening, a pair of vertically spaced horizontal walls extending between and connected to said depending side walls to define a heating chamber between themselves and said depending side walls, sprocket means disposed adjacent said ends, a horizontally disposed endless belt conveyor trained over said sprocket means and having vertically spaced top and bottom runs extending between said dependent walls, a pair of elongated housings carried by said dependent walls having end portions disposed along side of said sprockets, and connecting means opening through said dependent walls for communicating said elongated housings with the heating chamber for circulating a heating medium therein adjacent both runs of the conveyor and said sprockets.

GEORGE O. HOFFSTETTER.

REFERENCES CITED

The following references are of record in the file of this patent:

UNITED STATES PATENTS

| Number | Name | Date |
|---|---|---|
| 119,903 | Wakelee | Oct. 10, 1871 |
| 516,995 | Williams | Mar. 20, 1894 |
| 763,349 | Armstrong | June 28, 1904 |
| 888,257 | Passburg | May 19, 1908 |
| 1,329,407 | Hogue | Feb. 3, 1920 |
| 2,215,964 | Knowles | Sept. 24, 1940 |